United States Patent

Sourgen et al.

[11] Patent Number: 5,850,452
[45] Date of Patent: Dec. 15, 1998

[54] METHOD FOR NUMERICALLY SCRAMBLING DATA AND ITS APPLICATION TO A PROGRAMMABLE CIRCUIT

[75] Inventors: Laurent Sourgen, Aix-en-Provence; Sylvie Wuidart, Pourrieres, both of France

[73] Assignee: STMicroelectronics S.A., Italy

[21] Appl. No.: 509,363

[22] Filed: Jul. 31, 1995

[30] Foreign Application Priority Data

Jul. 29, 1994 [FR] France ................... 94 09485

[51] Int. Cl.$^6$ ................................... H04L 9/00
[52] U.S. Cl. ................... 380/50; 380/9; 380/28; 380/49; 380/59
[58] Field of Search ............. 380/9, 28, 29, 380/37, 46, 49, 50, 59, 4; 364/717, 717.01, 717.02, 717.03, 717.04, 717.05, 717.06, 717.07; 331/78

[56] References Cited

U.S. PATENT DOCUMENTS

| | | | |
|---|---|---|---|
| 3,958,081 | 5/1976 | Ehrsam et al. | 380/29 |
| 3,962,539 | 6/1976 | Ehrsam et al. | 380/29 |
| 4,172,213 | 10/1979 | Barnes et al. | 380/29 |
| 4,203,166 | 5/1980 | Ehrsam et al. | 380/29 X |
| 4,278,837 | 7/1981 | Best . | |
| 4,633,388 | 12/1986 | Chiu . | |
| 5,095,525 | 3/1992 | Almgren et al. . | |

FOREIGN PATENT DOCUMENTS 2504730  10/1982  France  ................ H01L 21/82

OTHER PUBLICATIONS

"Cell Design for Multiple Logic Circuit Families," IBM Technical Disclosure Bulletin, vol. 33, No. 1B, Jun. 1990, pp. 323–324.

*Primary Examiner*—Bernarr E. Gregory
*Attorney, Agent, or Firm*—Gunster, Yoakley, Valdes-Fauli & Stewart

[57] ABSTRACT

The present invention concerns a method for the numerical scrambling by permutation of data bits in a programmable circuit comprising a control unit and at least one data bus (DBUS) to transmit data between the control unit and several memory circuits. It consists of having data on the bus either in a scrambled form or in an unscrambled form according to whether it is instructions data or not. And data in some of the memories is scrambled. The present invention also concerns a method for realising a permutation circuit.

24 Claims, 4 Drawing Sheets

METHOD FOR NUMERICALLY SCRAMBLING DATA AND ITS APPLICATION TO A PROGRAMMABLE CIRCUIT

The present invention concerns a procedure for numerical scrambling and its application to a programmable circuit for essentially protecting against inspection of an executable programme. The present invention is notably applicable to smart card circuits that are used for financial transactions, i.e. credit cards containing integrated circuits.

The data instructions of a programme contained in a programme memory are normally protected by mixing the memory address data and the data instruction stored at that memory address. Thus, this data is not arranged in the memory according to its logical address, but is scattered around the memory. In the operational mode of the programmable circuit, a specific decoding circuit allows the actual memory address, where a data instruction is stored, to be retrieved from the data instruction and according to its logical address.

This method allows protection against visual inspection of the memory programme. However, the data instructions are in their original and correct format during transmission on the data bus when they are required to be executed by a microprocessor that is associated with the circuit. Therefore, it is technically possible to interrogate the data bus so as to directly read the data that is transmitted by means of this bus. The programme can therefore be reconstituted into its original and correct format, and in practice, the protection given by such a method is thus limited.

Furthermore, because of the complexity of the address decoding circuit and the necessity to limit fabrication costs, a given family of products will have the same decoding circuits; in such a situation, having found the key to the coding in one of the family of products, this will allow the actual memory addresses, where the data instructions are stored, to be found for the complete family of products.

Thus, if a fraudulent person manages to reconstruct the original and correct program for one of the family of products, the fraudster will be able to obtain a correspondence between the actual addresses and the logical addresses that will allow the fraudster to find the key to the coding and the algorithm used to mix the addresses. The fraudster will thus have the solution for all of the products within that same family.

An object of the present invention is to improve the protection of data in a programmable circuit through a scrambling method using data bits permutation.

Another object of the present invention is to provide a method for protecting data that is easily implemented and that allows individual protection for each product.

As known, an executable programme contains data, part of data being instructions data of the programme.

According to the invention, either the instructions data or the other data is scrambled in the programme memory. The bits permutation of one of these two groups of data is carried out during the generation of the executable code.

Thus, in the programme memory there is scrambled data among other data not scrambled.

According to usual meaning, a programme memory is the whole set of physical addresses where data of the executable code is memorized in. These addresses may pertained to different memory circuits, for example to ROM and RAM memories.

Such as it is characterized, the present invention concerns a method for numerical scrambling of data.

According to the invention, the scrambling is made by an executable code generator, which discriminates the instructions data among all the data of a programme, in order to apply a first bits permutation to either the instructions data or to the other data.

A code with scrambled data mixed among not scrambled data is obtained. In this way, the protection of the programme is significantly improved.

The scrambled code thus obtained is charged in a programme memory of a programmable circuit which comprises a control unit.

Preferably, it is the instructions data that is scrambled. This allows advantageously instructions data to be unscrambled only at the instructions input of the control unit, after its transmission towards the data bus.

If it is the other data that is scrambled, the unscrambling may occur at the data input of the control unit. Or else, the inverse permutation may be applied at the output of the programme memory, so that instructions data is in scrambled form on the bus. The instructions data is then unscrambled at the instructions input of the control unit.

In an improvement, a second bits permutation may be applied to all data contained in a rewritable memory circuit. The rewritable memory may pertained to the programme memory or not. By applying data of the rewritable memory to a permutation circuit placed between this memory and the data bus, a scrambling of data to be memorized and an unscrambling of data to be transmitted are obtained, according to this second bits permutation.

Thus scrambled data according to the first permutation and according to the first and second permutations are memorized in the programme memory among other data in clear form, while on the data bus are transmitted scrambled data according to the first permutation among data in clear.

It becomes difficult for an unauthorized person to recognize what is what.

The present invention also concerns a programmable circuit comprising at least one permutation circuit of data bits, for data of n bits.

According to the present invention, the permutation circuit comprises n permutation stages with n inputs and one output, each stage comprising n permutation cells.

Advantageously a permutation cell can be realised according to the same technology that is used for the cells associated with the programme memory.

BRIEF DESCRIPTION OF THE DRAWINGS

Other characteristics and advantages of the present invention are described in the following description that is intended to be non-limiting with respect to the following diagrams in which.

According to the invention, a generator of executable code discriminates instructions data of a programme against other data, in order to apply a scrambling using bits permutation to either the instruction data or else the other data.

Figure 1:
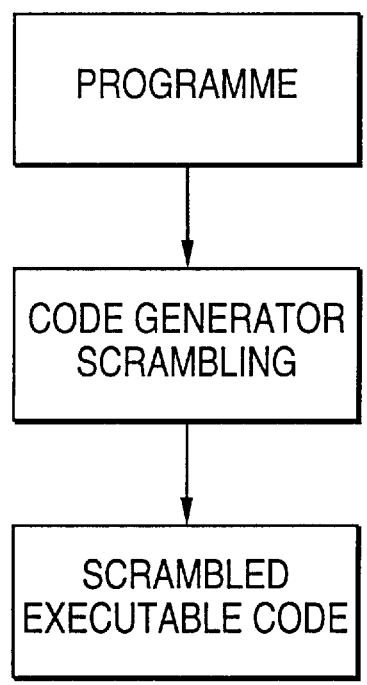
FIG. 1 shows the principle of the scrambling method of the invention.

This is shown on FIG. 1.

An executable code is thus obtained, having scrambled data among other data not scrambled.

This executable code is memorized in a programme memory of a programmable circuit: mask programming for a read-only memory and/or downloading in a rewritable memory (RAM, EEPROM or else).

Figure 2:
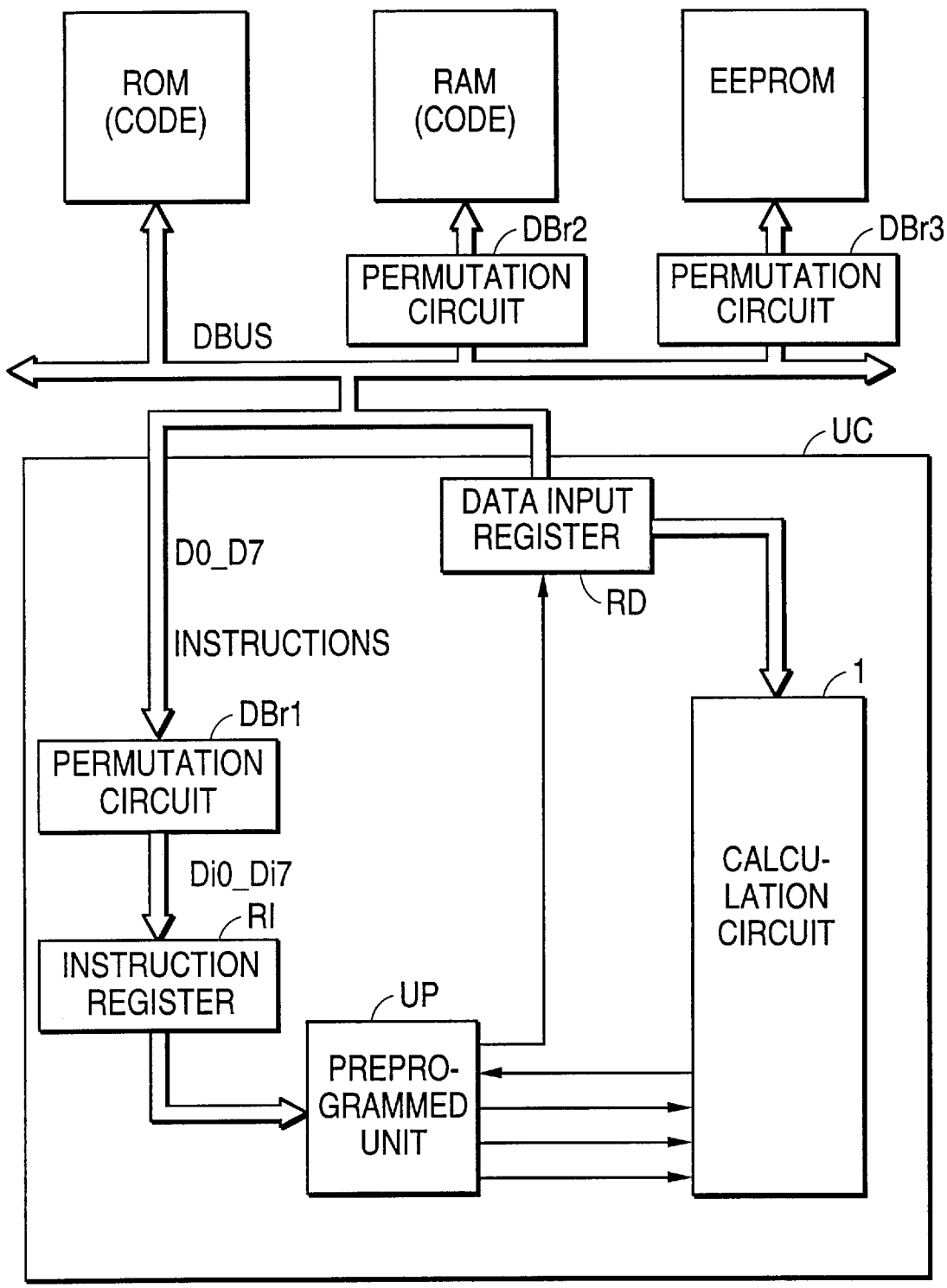
FIG. 2 is a schematic block diagram of a programmable circuit that is protected according to the present invention.

A programmable circuit according to the invention is shown on FIG. 2. It includes a control unit UC that can, for example, be represented by a microprocessor. In this example, the control unit has an instructions input on an instruction register RI, a data input on a data input register RD and comprises a programmed unit UP. This programmed unit UP receives data instructions to execute from the instruction register RI and controls a data register RD. The control unit also controls, for example, arithmetic computation and logic circuits or counters that have been grouped together in a calculation circuit that is referenced as 1 in this Figure. In the example shown, the calculation circuit 1 receives data from the data register RD and carries out computations upon the data according to the instructions within the programmed unit.

The different data is respectively transferred to its associated data register or instruction register via a data bus DBUS that is connected to different memory circuits.

In the example shown in FIG. 2, the programmable circuit includes a read-only memory ROM and rewritable memories, in the example a random memory RAM and an electrically programmable/erasable memory EEPROM. In this example, the executable code is memorized in the ROM and RAM memories.

According to the present invention, data is in scrambled or unscrambled form on the data bus according to whether it is instructions data or not.

Preferably, the instructions data is transmitted in scrambled form. And a permutation circuit DBr1 is placed at the instructions input of the control unit. This permutation circuit unscrambles the scrambled instructions data that is stored in the programme memory and transferred via the data bus DBUS. Instructions data is thus scrambled on the data bus.

If it is other data (ie not instructions data) that is scrambled by the code generator, the inverse permutation is applied at output of the programme memory. Or else, the scrambled data is transmitted scrambled towards the data bus and a permutation circuit is placed at the data input of the control unit.

The method according to the invention allows many combinations.

In the example shown in FIG. 2 which addresses more particularly to the case where instructions data is transmitted in scrambled form towards the data bus, two other permutation circuits DBr2 and DBr3 are provided with.

The first one is placed between the RAM memory and the data bus, and the second is placed between the EEPROM memory and the data bus. Thus, data memorized in these two memory circuits is in scrambled form respectively according to a second and a third permutations, but is transmitted in unscrambled form through the data bus.

More precisely, in the example shown, instructions data memorized in RAM has been permuted twice: the first permutation is the specific one realized during the code generation and the second permutation is the one applied at input of the RAM memory.

An other memory circuit could memorize unscrambled data that will be transmitted in this unscrambled form on the data bus, ie without an associated permutation circuit (not shown).

The method according to the invention thus allows a different scrambling to be applied to instructions data of the programme memory than the one applied to other data: different memorized and transmitted forms, and also to apply a different scrambling to each one of the rewritable memories: permutation or not, selection of the bits permutation different from a rewritable memory to another.

Thus, according to the invention, the difficulty to spy the data and understand the protection scheme is increased, as data are differently scrambled according to the memory where it is memorized.

The structure chosen depends mainly from the application to which the programmable circuit is directed. And as will be seen later, different selections of bits permutation may be easily used for different programmable circuits.

Figure 3:
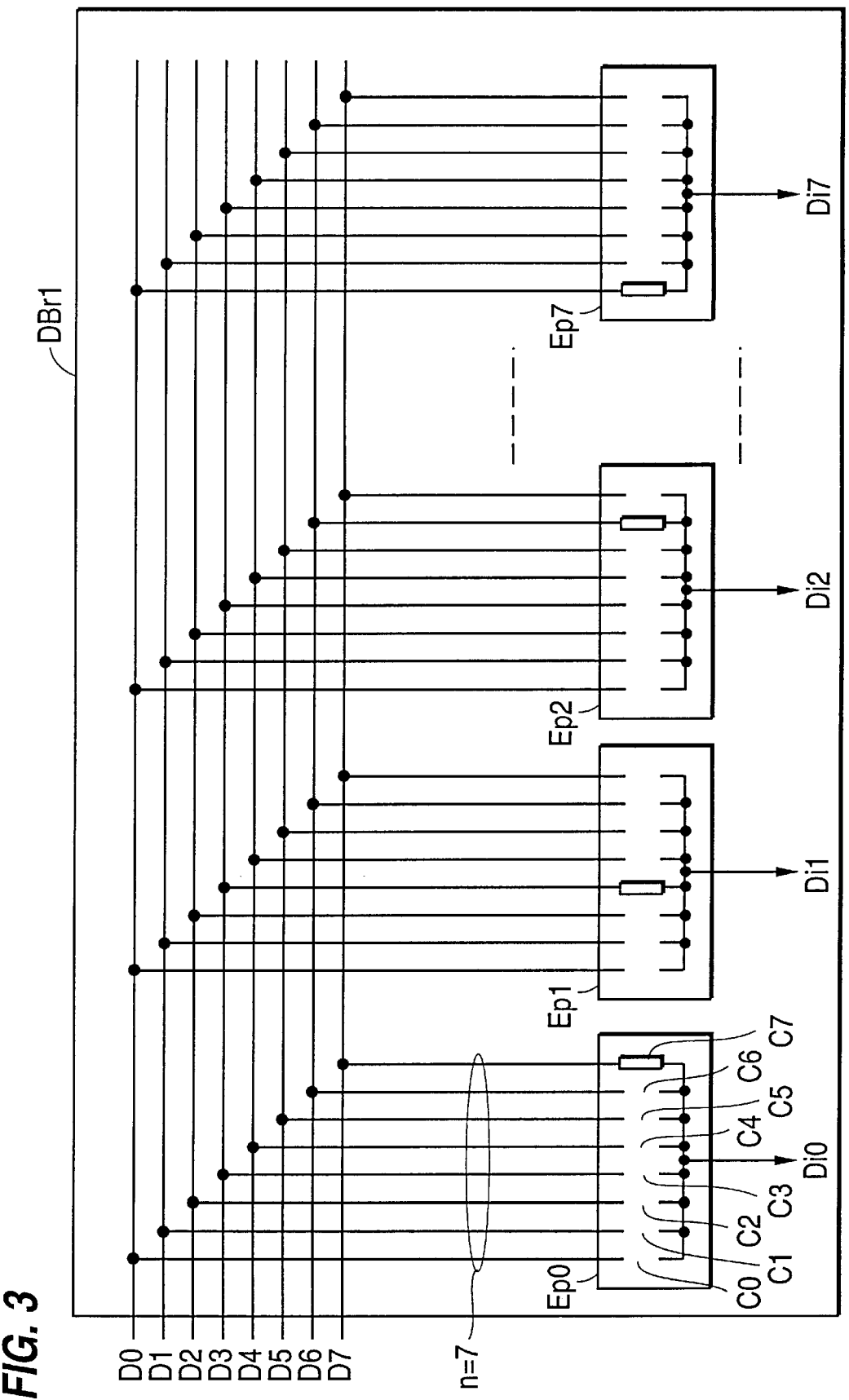
FIG. 3 is a schematic diagram of the principle of the permutation circuit according to the present invention.

FIG. 3 illustrates an example of a realisation of the principle of such a permutation circuit according to the present invention.

The data bus DBUS is illustrated as having a width of n data bits and the permutation circuit comprises n permutation stages that are denoted Ep0 to Ep7 in the example illustrated (n=8).

Each permutation stage receives at its input the n data bits, that are denoted in this example as D0 to D7, from the data bus and supplies an unscrambled output data bit: the permutation stage Ep0 supplies the output bit Di0 . . . the permutation stage Ep7 supplies the output bit Di7. These are the output data bits Di0–Di7 that are applied to the input of the instruction register RI.

In the present example, each permutation stage comprises n permutation cells c0–c7 each of whose function is to act as a fuse cell. Only one amongst the n fuse cells is permitted to pass, i.e transmit, the input data bit that appears on the data bit output of the permutation cell.

Each permutation stage has a correspondingly different fuse cell that allows a data bit to pass.

In the example represented, the pass cell of stage:

| | | |
|---|---|---|
| Ep0 | is | c7 |
| Ep1 | | c3 |
| Ep2 | | c6 |
| . | | |
| . | | |
| Ep7 | | c0 |

The permutation circuit DBr1 is therefore characterised by a permutation selection for each stage. For an n bit data bus there are:

n possibilities for the first stage Ep0;

n-1 possibilities for the second stage Ep1;

and so on.

The method of scrambling, according to the present invention, therefore allows n! different possible scrambling combinations for an n bit data bus.

If a memory is chosen such that its data port width is different to the width of the data bus, and in particular larger, the generator will have to carry out the scrambling of the programme, after having split data into n bit bytes.

Figure 4:
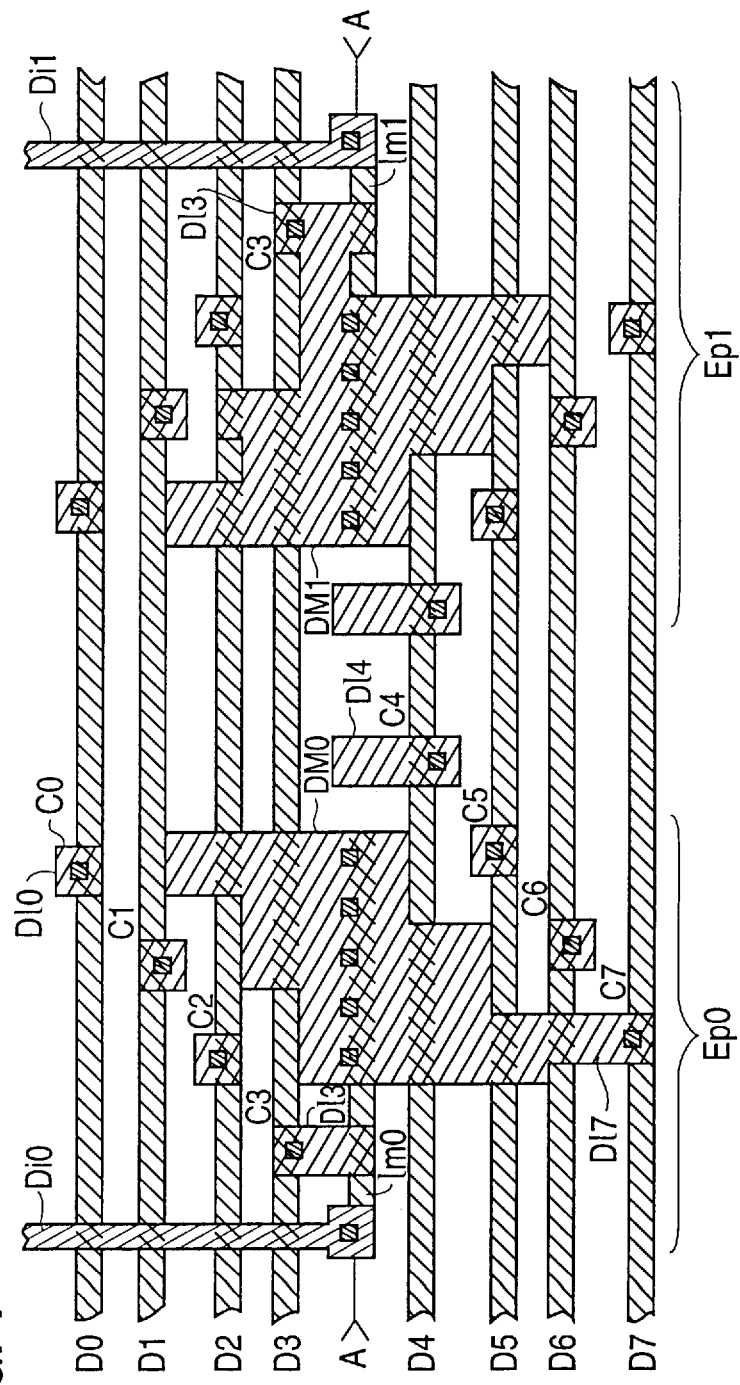
FIG. 4 is a topological design of two stages of a permutation circuit according to the present invention and FIG. 5 is a cross sectional view in the plane AA of the topological design represented in FIG. 4.
Figure 5:
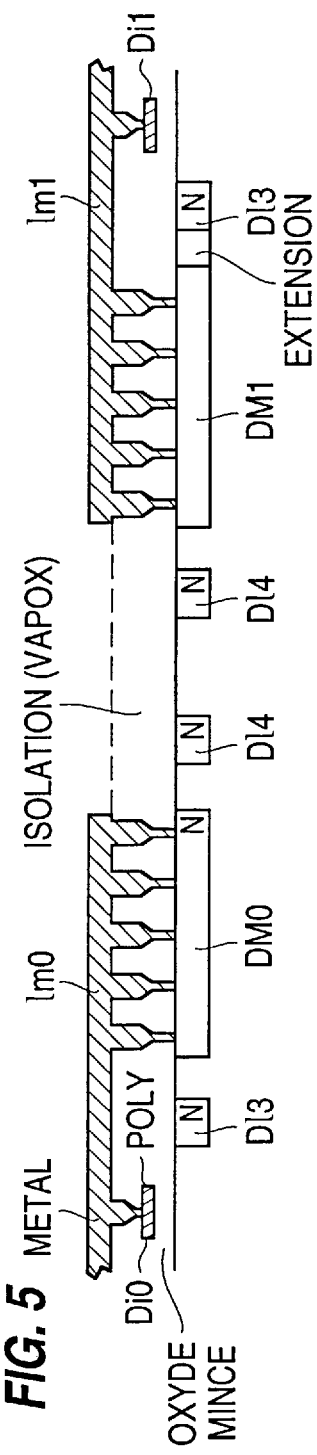

An example of a realisation of a permutation circuit is represented in FIGS. 4 and 5.

FIG. 4 represents a topographic design of the two permutation stages Ep0 and Ep1 each with n=8 input bits (D0–D7) and one output bit, respectively Di0 and Di1. FIG. 5 represents a cross-sectional view in the plane AA of the circuit of FIG. 4.

For each permutation stage Ep0, Ep1 there is a corresponding median, or central, interconnecting layer DM0, DM1 connected to the respective output bit line of the permutation stage.

And, for each cell c0–c7 of a permutation stage there is a local interconnecting layer connected to the respective input bit line associated with each cell. For example, there is a local interconnecting layer Dl0 for the cell c0 that is connected to the input data bit line D0.

Therefore, the programming of a permutation stage consists of extending the central interconnecting layer to the local interconnecting layer of one of the cells amongst the n cells of this permutation stage. Thus, in the example represented, permutation stage Ep0 has an extension of its central interconnecting layer DM0 to the local interconnecting layer Dl7 of the cell c7 and permutation stage Ep1 has its central interconnecting layer DM1 extended to the local interconnecting layer Dl3 of the cell c3.

In the example represented, the input data bit lines D0–D7 are realised in metal and are parallel with one another. The output data bit line, for example Di0, is realised in polysilicon and it is sandwiched between the input data bit lines and the substrate. The connection, or contact, between the central interconnecting layer and the output data bit line is made by a metal line that is realised on the same plane, or level, as the input data bit lines and is parallel with these input data bit lines. This metal connection line is denoted by lm0 for the stage Ep0 and lm1 for the stage Ep1.

The central and local interconnecting layers may be made of diffusions, metal or else, depending on the technology of the programmable circuit.

For example and as particularly shown on FIGS. 4 and 5, the central and local interconnecting layers are carried out by ion implantation (referred to as the implant procedure). Or the central interconnecting layer is of metal.

In the cross-sectional view in the plane AA of FIG. 5, there is a clear distinction, within the stage Ep0 for example, between the polysilicon output data bit line Di0 that is connected to the metal line lm0 above it and the contacts of this metal line lm0 to the central interconnecting layer DM0 of the permutation stage Ep0.

The local interconnecting layers Dl3 and Dl4 of the respective cells c3 and c4 of the stages Ep0 and Ep1 are also visible in FIG. 5. Furthermore, referring to FIG. 5, the extension of the central interconnecting layer DM1 to the local interconnecting layer Dl3 of the cell c3 of stage Ep1 can also be seen.

The particularisation of a permutation stage is thus made by an extension of its central interconnecting layer to a local interconnecting layer of a selected input data bit line: the extension is determined by the mask set design i.e. the fabrication process.

According to the present invention, the programming of the permutation circuit thus consists, according to this fabrication process, of selecting an extension to the central interconnecting layer out to a local interconnecting layer which defines the permutation. This extension of the central interconnecting layer allows the connection of a selected input data bit line and the output data bit line for a permutation stage.

This programmable particularisation of a permutation stage is particularly easy to implement and it allows flexible adaptation to the fabrication process of each programmable circuit: using the permutation circuits with other memories or not, with identical scrambling or not, etc . . . and it allows different scrambling for each programmable circuit: thus one is not restricted to the same identifiable protection within the same family of products. This results in a considerable improvement in the protection of the programmable circuits.

An advantage of this scrambling technique applied to a read-only memory is that it uses the same fabrication process that is used in conjunction with the read-only memory cells:

- on one hand, the permutation cells and the read-only memory cells can therefore be realised during the same fabrication steps using the same masks, by means of the same type of interconnecting layers, the programmation in the circuit of the programme and the scrambling specified by the client being made at the same manufacturing stage, simplifying the manufacturing process;
- on the other hand, the difficulty in carrying out visual inspection of the circuit is increased by using similar technologies and layout techniques.

According to the method described above in relation to FIGS. 4 and 5, the programming of scrambled executable data in the read-only memory is realised by using a central interconnecting layer for an identical bit line and a local interconnecting layer for each cell extended to or not by the central interconnecting layer according to whether the cell is required to be programmed to a 0 or a 1 state.

We claim:

1. A programmable circuit, comprising:

n input lines and n output lines;

n permutation stages, each having a central interconnecting layer which is connected to a respective one of said n output lines and a local interconnecting layer, portions of which connect respective ones of said input lines to the level of said central interconnecting layer;

wherein the programming of a permutation stage consists of extending said central interconnecting layer of said permutation stage to a respective local interconnecting layer.

2. A programmable circuit according to claim 1, wherein said central interconnecting layer and said local interconnecting layer are ion implanted silicon.

3. A programmable circuit according to claim 1, wherein said central interconnecting layer is made of metal and said local interconnecting layers are ion implanted silicon.

4. A programmable circuit according to claim 1, wherein a read-only memory is formed and programmed in the same manufacturing steps as said permutation stages.

5. The circuit of claim 4, wherein the difficulty of visually inspecting a descrambling key is increased by the use of the same manufacturing steps as are used in said read-only memory.

6. A numerical scrambling method for a programmable circuit, comprising the steps of:

(a.) accepting a first set of data from a data bus, applying a first scrambling operation to said first set of data to produce a first set of scrambled data, which is then stored in a first rewritable memory;

(b.) accepting a second set of data from said data bus, applying a second scrambling operation, which is different from said first scrambling operation, to said second set of data to produce a second set of scrambled data, which is then stored in a second rewritable memory, which is different from said first rewritable memory; and (c.) when a memory read request is accepted, reading one of said sets of scrambled data from a respective one of said rewritable memories, applying a respective inverse scrambling operation, corresponding to a respective one of said scrambling operations, to said respective set of scrambled data to reproduce said respective set of data, and placing said set of data on said data bus.

7. A method according to claim 6, wherein said scrambling operations are a bit permutation of said data.

8. The programmable system of claim 6, wherein said first rewritable memory is a random access memory.

9. The programmable system of claim 6, wherein said second rewritable memory is an electrically erasable, programmable memory.

10. The programmable system of claim 6, wherein said first set of data transmitted on said data bus is scrambled.

11. The programmable system of claim 6, wherein said second set of data transmitted on said data bus is unscrambled.

12. The programmable system of claim 6, further comprising a read-only memory in which instructions are stored and transmitted to a data bus in scrambled form.

13. A method according to claim 6, wherein said scrambling operations are performed by a passive circuit.

14. A numerical scrambling method for a programmable circuit, comprising the steps of:

(a.) generating a first set of data:

(b.) applying a first scrambling operation to said first set of data to obtain a second set of scrambled data;

(c.) transmitting said second set of scrambled data over a data bus to a rewritable memory, (d.) applying a second scrambling operation to said second set of scrambled data to produce a third set of scrambled data and storing said second set of scrambled data n said rewritable memory;

(e.) reading said third set of scrambled data from said rewritable memory and applying an inverse scrambling operation, corresponding to said second scrambling operation, to said third set of scrambled data to reproduce said second set of scrambled data, which is transmitted over said data bus;

(f.) applying an inverse scrambling operation, corresponding to said first scrambling operation, to said second set of scrambled data, to reproduce said first set of data.

15. A method according to claim 14, wherein said scrambling operations are a bit permutation of the data to be scrambled.

16. The method of claim 14, wherein said scrambling operations are performed by a passive circuit.

17. A memory comprising:

a memory;

a data bus on which are transmitted a first set of data, which is in a scrambled form;

a scrambling circuit having an first and second port, said first port connected to said data bus, said second port being operatively connected to said memory;

wherein said scrambling circuit performs a permutation of said first set of data to obtain a second set of data which is then stored in said memory and performs a reverse permutation on said second set of data in said memory to reproduce said first set of data which is then transmitted on said data bus.

18. A memory according to claim 17, wherein said memory is rewritable.

19. A method according to claim 17, wherein said scrambling circuit is a passive circuit.

20. A processing unit comprising:

a processor, connected through a data bus to a first and a second memory;

a first passive scrambling circuit having a first and a second port, and connected to receive a first data string from said data bus and to permute said first data string into a first scrambled data set to be stored in said first memory;

a second passive scrambling circuit having a first and a second port, and connected to receive a second data string from said data bus and to permute said second data string into a second scrambled data set to be stored in said second memory;

wherein said first memory is a different type of memory from said second memory;

wherein said first scrambling circuit performs a different permutation from said second scrambling circuit.

21. A processing unit according to claim 20, wherein said first and second scrambling circuits are passive logic circuits.

22. A numerical scrambling method comprising the steps of:

reading data from a memory address: and applying a scrambling operation to at least two bits of said data to produce scrambled data, wherein said scrambling operation is performed by a passive circuit, said passive circuit comprising:

n input lines;

n output lines; and a connection from each said input line to a respective output line such that data received on said input lines is output on said output lines in at least partially scrambled form, wherein the pattern of metallization, including used and unused vias, increases the difficulty of visually inspecting a descrambling key.

23. A method of protecting a smart card from fraud, said method comprising:

(a.) storing scrambled programming instructions in a read-only-memory of said smart card;

(b.) retrieving said scrambled programming instructions for transmission via a data bus to a descrambling unit;

(c.) descrambling said scrambled programming instructions using a passive descrambling unit in which the pattern of metallization, including both used and unused vias, increases the difficulty of visually determining a descrambling key.

24. The method of claim 23, wherein said passive descrambling unit comprises:

n input lines;

n output lines;

a connection from each said input line to a respective output line such that data received on said input lines is output on said output lines in at least a partially scrambled form;

wherein the pattern of metallization patterns, including used and unused vias, increases the difficulty of visually inspecting a descrambling key.

* * * * *

UNITED STATES PATENT AND TRADEMARK OFFICE
CERTIFICATE OF CORRECTION

| | | |
|---|---|---|
| PATENT NO. | : 5,850,452 | |
| APPLICATION NO. | : 08/509363 | |
| DATED | : December 15, 1998 | |
| INVENTOR(S) | : Laurent Sourgen et al. | |

It is certified that error appears in the above-identified patent and that said Letters Patent is hereby corrected as shown below:

Column 1, line 64, "pertained" should be -- pertain --.
Column 2, line 24, "pertained" should be -- pertain --.
Column 3, line 57, "permutations" should be -- permutation --.
Column 6, line 61, "rewrittable" should be -- rewritable --.
Column 7, line 52, "an" should be -- a --.

Signed and Sealed this

Fourth Day of September, 2007

JON W. DUDAS
*Director of the United States Patent and Trademark Office*